Nov. 17, 1925.　　　　　　　1,561,890
J. A. TRAYLOR
UNIVERSAL JOINT
Filed March 19, 1923

INVENTOR
Joseph A. Traylor
BY W. N. Roach
ATTORNEY

Patented Nov. 17, 1925.

1,561,890

UNITED STATES PATENT OFFICE.

JOSEPH A. TRAYLOR, OF CAMP MEADE, MARYLAND.

UNIVERSAL JOINT.

Application filed March 19, 1923. Serial No. 626,179.

(GRANTED UNDER THE ACT OF MARCH 3, 1883; 22 STAT. L. 625.)

*To all whom it may concern:*

Be it known that I, JOSEPH A. TRAYLOR, a citizen of the United States, and a resident of Camp Meade, county of Anne Arundel, and State of Maryland, have invented an Improvement in Universal Joints, of which the following is a specification.

The invention described herein may be used by the Government, or any of its officers or employees in prosecution of work for the Government, or by any other person in the United States, without payment to me of any royalty thereon, in accordance with the act of March 3, 1883.

The subject of this invention is a universal joint, intended primarily, for use with a transmission shaft of a motor vehicle, though susceptible of use wherever a universal joint of such character is desired.

The main object of the invention is the provision of a universal joint in which the parts will assume various positions with respect to each other with a minimum of friction and without binding.

A further object of the invention is the provision of a simple, cheap and efficient joint.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein.

Figure 1:
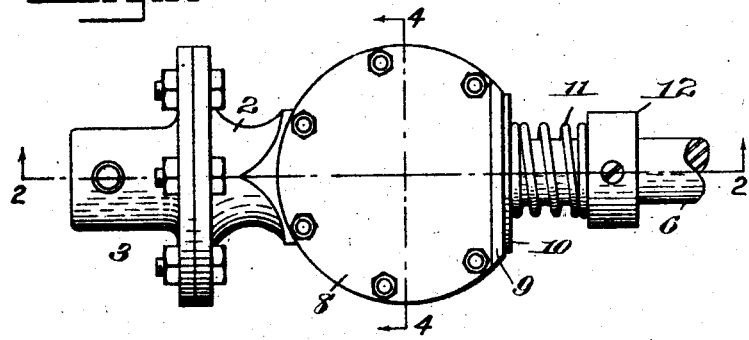
Fig. 1 is a view in elevation of a joint constructed in accordance with my invention.
Figure 2:
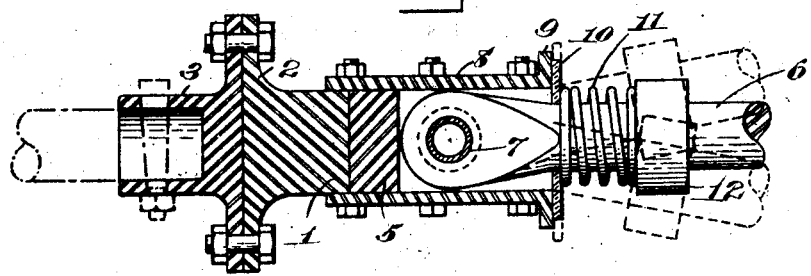
Fig. 2 is a longitudinal section taken on the line 2—2 of Fig. 1.
Figure 3:
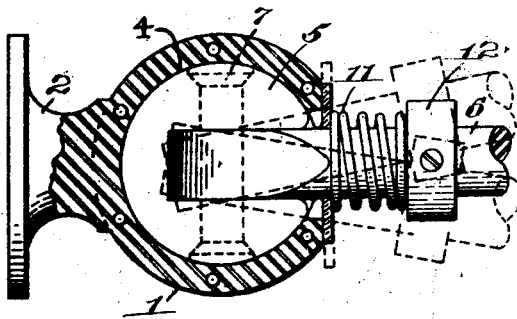
Fig. 3 is a view in elevation, partly in section, the section being taken on the plane at right angles to that of Fig. 2.
Figure 4:
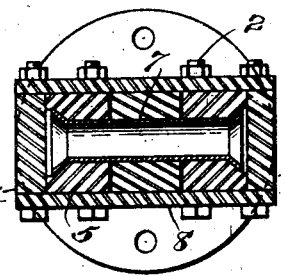
Fig. 4 is a cross section on the line 4—4 of Fig. 1.

Referring to the drawing by numerals of reference:

In carrying out my invention I prefer to provide a casing 1 formed with means, herein shown as the flanged projection 2, for connecting the casing to a rotating element, such as hub 3. The casing is apertured at 4, and mounted within the casing is a circular member or yoke 5 to which is connected for oscillation a shaft 6 preferably formed with a flattened end provided with an aperture through which a wrist pin 7 passes, the wrist pin being connected to the yoke as seen most clearly in Fig. 4. The casing may be closed in any convenient manner as by the plates 8 which, as herein shown, are bolted thereto and the plates are conveniently formed with flanges 9 which provide a bearing surface for a washer 10 which encircles the shaft 6 and is held against the casing and flanges by a spring 11, which is retained against the washer and tensioned by means of a collar 12 which encircles the shaft. The purpose of the washer is to exclude dust and foreign matter from the casing.

I claim:

1. A universal joint, embodying a circular casing provided with an aperture, means for connecting the casing to a rotatable element, a yoke fitting within the casing, a shaft pivotally connected to the yoke and passing through the aperture, flanged plates closing the casing, a disc surrounding the shaft and resting on the casing and flanges and means carried by the shaft for holding the disc in close sliding contact with the casing and flanges.

2. A universal joint, embodying a circular casing provided with an aperture, means for connecting the casing to a rotatable element, a circular member oscillatable within the casing having a recess formed with opposed flat faces, means for retaining the member within the casing, a shaft passing through the aperture having its end located within the recess, said end having flat faces to engage the similar faces of the recesses and means carried by the shaft for closing the aperture.

JOSEPH A. TRAYLOR.